Figure 1:
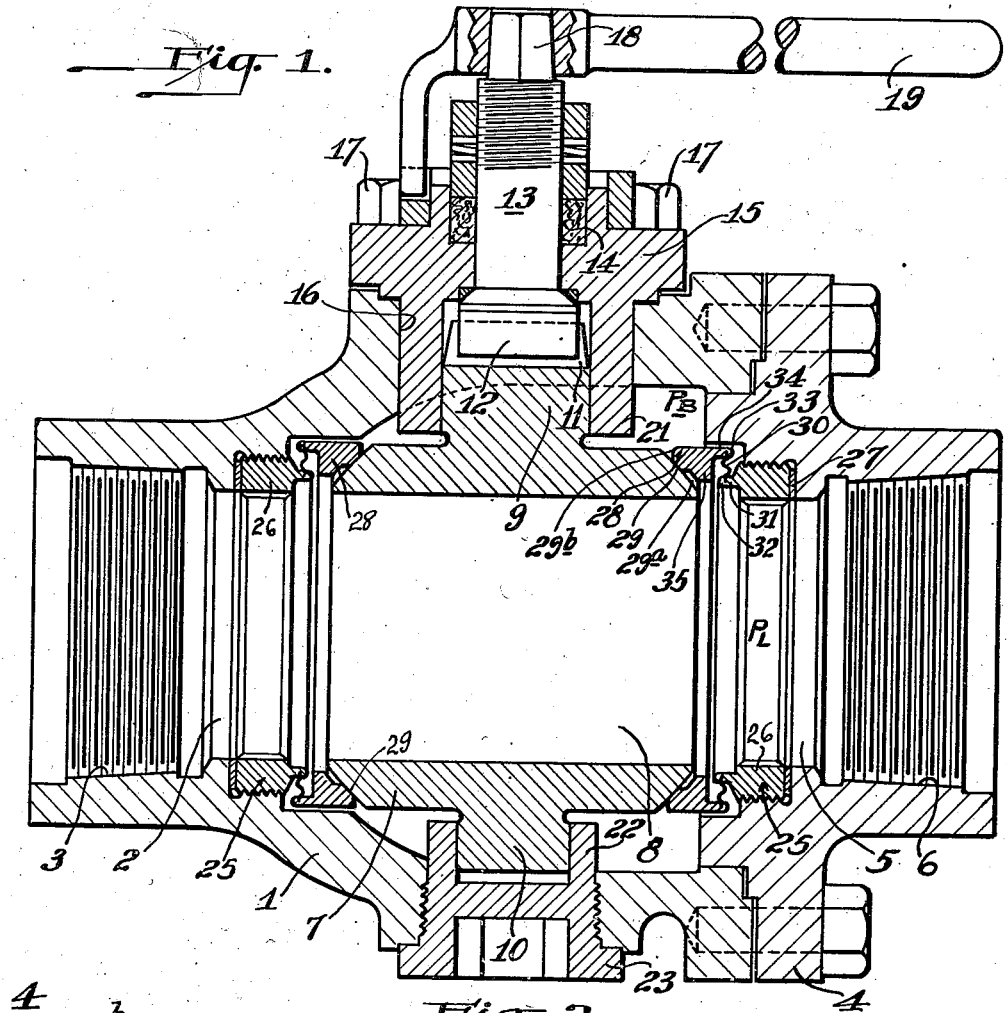

Feb. 20, 1940. J. HEINEN 2,191,232
VALVE AND SEALING MEANS THEREFOR
Filed Aug. 25, 1938 4 Sheets-Sheet 3

Patented Feb. 20, 1940

2,191,232

UNITED STATES PATENT OFFICE 2,191,232

VALVE AND SEALING MEANS THEREFOR

Joseph Heinen, Long Beach, Calif.

Application August 25, 1938, Serial No. 226,615

12 Claims. (Cl. 251—113)

This invention relates to means adapted to seal between spaced-apart bodies and is more particularly concerned with plug or cock valves including such sealing means, the valves being adapted to control the flow of fluids even under difficult pressure conditions.

Heretofore, plug, gate, or other valves of various types have been provided, which are in many instances satisfactory for controlling the flow of fluids under relatively low pressures. However, I have found that known types of valves are open to many objections when employed to control the flow of fluid under high pressures or under other difficult pressure conditions. Among these objections are the difficulty of operating the valve due to heavy frictional loads on the seats when the valve is subjected to the pressure of the fluid, the wear or galling of valve seats, collapsing of inserted valve seats, and the inability to provide a tight leakproof valve adapted to operation over long periods. Other objections comprise the relatively high cost of manufacture of known types of high pressure valves requiring relatively complicated operating mechanism, and/or grease lubrication. Again, high maintenance cost, due chiefly to complicated machining requirements and complicated structure, has been an objectionable factor. As a result, plug, gate, or other valves, although now used in the control of fluids under high pressure, as for example in the oil fields, are not very satisfactory.

It is the general object of my invention to avoid and overcome the foregoing and other difficulties of and objections to valves of the type described by the provision of an improved valve particularly adapted for operation under difficult pressure conditions, and in which the forces resulting from the pressure or pressures of the fluid on the sealing means tending to force the sealing means toward the cock are counterbalanced by the forces tending to move the sealing means away from the cock, and a mechanical force such as the tension of a spring, or the like, is used to force the sealing means against the plug.

Another object of my invention is the provision of an improved sealing means or packing adapted to seal between spaced-apart bodies, such as a housing and a relatively movable member with a desired sealing pressure in which a mechanical force is provided to push the sealing means toward the body and which is (1) augmented by the forces resulting from the fluid pressures on the sealing means; or (2) is diminished by the forces resulting from the fluid pressures on the sealing means; or (3) is neither augmented nor diminished.

Another object of my invention is the provision of a plug or cock valve, as for example of the spherical ball type, which is readily operated when controlling the flow of fluid even under very high pressure, and which is leakproof over long periods of time even though the valve is operated repeatedly.

Another object of my invention is to provide an improved valve capable of controlling the flow of fluid under high pressure, which valve is relatively inexpensive to manufacture and maintain, and which is relatively long-lived and of a comparatively simple construction.

Another object of my invention is to provide a leakproof flexible joint having spaced-apart bodies, such as relatively movable members joined together by flexible means and in which the relatively movable members and the flexible means can be so constructed, arranged and positioned within a space to be sealed that the effects of any fluid pressure or pressures applied to the flexible means that are communicated to the movable member are counterbalanced by the effects of a fluid pressure or pressures applied to the movable member. The effects of the fluid pressure on the member and flexible means remain counterbalanced irrespective of the changes in pressures of the fluids on either side of the flexible means whether the fluid pressure on one side is greater, less than, or equal to the fluid pressure on the other side.

Another object of my invention is the provision of a plug or cock valve adapted to be used to control the flow of fluid under high pressures and in which the valve can be easily operated by a relatively short wrench and in which the sealing means in the valve are not subject to galling.

Another object of my invention is the provision of an improved plug or cock valve adapted to be used to control the flow of fluid under high pressure and in which the pressure of the fluid on the ball or plug is carried by bearings independent of the sealing means which is positioned between the housing and the plug or ball, and the effects of the fluid pressure or pressures on the sealing means tending to force the sealing means toward or away from the plug are balanced or substantially balanced.

Another object of my invention is the provision of an improved valve of the plug or cock type for controlling the flow of fluid in which one or more seats seal between the valve housing and the rotatable plug and in which the seats always remain against the plug and have a wiping action thereon when the valve is open, or closed, which construction causes the seats to burnish in, polish, and improve with operation and which prevents foreign matter or dirt from getting between the seats and the plug.

Another object of my invention is the provision of an improved valve adapted to control the flow of fluid under high pressures and in which means are provided for compensating for any expansion, contraction or twisting of the valve body.

The foregoing and other objects of my invention are achieved, for example, by the provision of a plug or cock valve comprising a housing having inlet and outlet ports, a plug rotatably received in the housing and having an opening therethrough adapted to connect the ports, means for rotating the plug to open and shut the valve, means for sealing between the plug and at least one port of the housing, the sealing means consisting of a seat ring positioned against the plug. The sealing means in the combination defined, or means associated therewith, are adapted to force the seat ring against the plug with a predetermined original resilient force, and the seat ring and sealing means are provided with a surface or surfaces adapted to be engaged by the fluid or fluids controlled by the valve to force the ring into engagement with the plug, and with another surface or surfaces adapted to be engaged by the fluid to force the ring away from the plug, with the result that the ring is balanced in so far as the effects of fluid pressures are concerned. The pressure upon the sealing ring and sealing means may be applied from the port side of the valve or from the interior of the body of the valve or from both sides simultaneously. The above condition of balance is maintained irrespective of the amount of the pressure or from whatever side the fluid pressure is applied.

I have found that the fluid pressure or pressures operate on the sealing face of the seat ring in contact with the plug. I am not able to establish a condition of balance or to obtain the other objects of my invention already recited until I adapt the area of the sealing face along with the other surfaces engaged by the pressures of the fluid or fluids. The pressure on the contact face may be different than the pressures on either side of the sealing means; thus the pressure of the contact face has a given relation to the pressure on either side of the sealing means, as hereinafter more fully explained. In the explanation of the role of the contact face the proper functions of the diaphragm will also be evaluated. In essence, the invention consists in the functioning of the contact surface and other surfaces of the sealing ring and the closure function of the diaphragm, although it should be appreciated that the above mentioned functions are employed to treat any force that the diaphragm communicates to the sealing ring.

A leakproof flexible joint embodying the principles of my invention and adapted to seal between a housing and a relatively movable member includes a housing ring adapted to be secured to the housing, a sealing ring having a sealing face adapted to be forced into sealing relation with the relatively movable member, and a flexible diaphragm connecting the rings. The sealing ring is provided with surfaces including the sealing face and adapted to be engaged by fluid pressures for substantially counterbalancing the effect of fluid pressures on the diaphragm that is communicated to the ring.

It is to be noted that the term "pressure" as employed throughout the specification and claims refers to absolute pressure and not gauge pressure.

My invention is concerned with the combination of spaced-apart bodies, means for sealing between the bodies to provide separate chambers, the means being adapted to be acted on by fluid pressures and including a sealing member having a sealing surface engaging in sealing relation with one of the bodies, a closure member secured to the sealing member and to the other body in sealing relation therewith, and resilient means for holding the sealing member in sealing relation with a predetermined force. Expressed in equation form, the sealing member and closure member are so constructed and arranged that the algebraic sum of the forces created by the fluid pressure acting to move the sealing member into and away from sealing relation is substantially zero in accordance with the following equation:

$$S(K \cdot P_L \cdot X') + S(T \cdot Z) + S(M \cdot P_L) + \\ S(N \cdot P_B) + S(R \cdot P_B \cdot X'') = 0$$

in which S is the sense in which the fluid pressure force tending to move the sealing member to or from sealing relation acts and is plus 1 when acting to move it to sealing relation and is minus 1 when acting to move it from sealing relation; K is the projected effective area of the closure member subjected to line pressure; $P_L$ is the line pressure; X' is the proportion of the force acting on the line side of the closure member which is communicated to the sealing member; T is the projected effective area of the sealing face of the sealing member; Z is the average fluid pressure operating on the face T; M is the projected effective area of the sealing member subjected to line pressure; N is the projected effective area of the sealing member subjected to body pressure; $P_B$ is the body pressure; R is the projected effective area of the closure member subjected to body pressure; and X'' is the proportion of the force acting on the body side of the closure member which is communicated to the sealing member.

The above applies to either of the two sealing means shown in any one of the figures of the drawings, for example, Fig. 1. However, the valve may be constructed with but a single sealing means. Where two sealing means are used, the pressure known as $P_B$, sometimes called body pressure, would be the same for either sealing means; the line pressures, however, would depend upon the pressure in the separate ports. In some instances the line pressure in the upstream port may be considerable, whereas the pressure in the downstream side may be atmospheric pressure or lower. In the event that a single sealing means is used, this means could be put either at the upstream port or the downstream port. In the event that the single sealing means is positioned at the upstream port the line pressure would be the pressure in the upstream port and the $P_B$ pressure would be practically equivalent to the pressure in the downstream port, as the body of the valve would in this case communicate directly with the downstream port.

If the sealing means is positioned at the downstream port, the $P_B$ pressure would be practically equal to the upstream line pressure, as the body of the valve would be in direct communication with the upstream port.

It will be noted further that the formula particularly includes the pressures on both sides of the closure member or diaphragm, as well as the pressures on both sides of the sealing member or seat ring. This is true not only when my invention is used as a valve but also when it is used as a sealing means broadly between spaced-apart bodies, as in a coupling. Specifically, when it is used in a coupling the line pressure or pressure on the two lines or conduits extending to the coupling become the same, and the pressures sealed by my invention are respectively the said line pressure and the pressure present on the outside of the coupling; for example, the atmosphere, which, of course, is the body pressure, as used throughout this description.

The present application forms a continuation-in-part of my application Serial No. 57,595, filed January 4, 1936, and entitled "Leakproof flexible joint". The present application also forms a continuation-in-part of my application Serial No. 152,937, filed July 10, 1937, and entitled "Valve".

Figure 2:
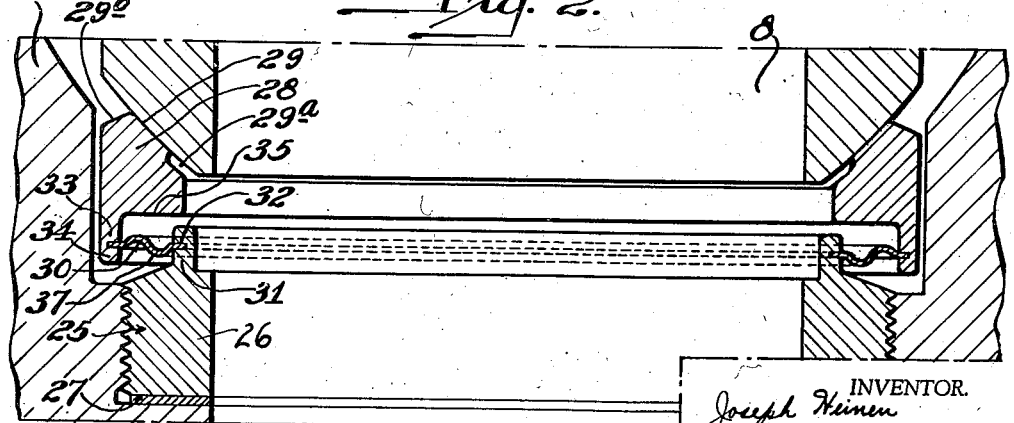
Figure 3:
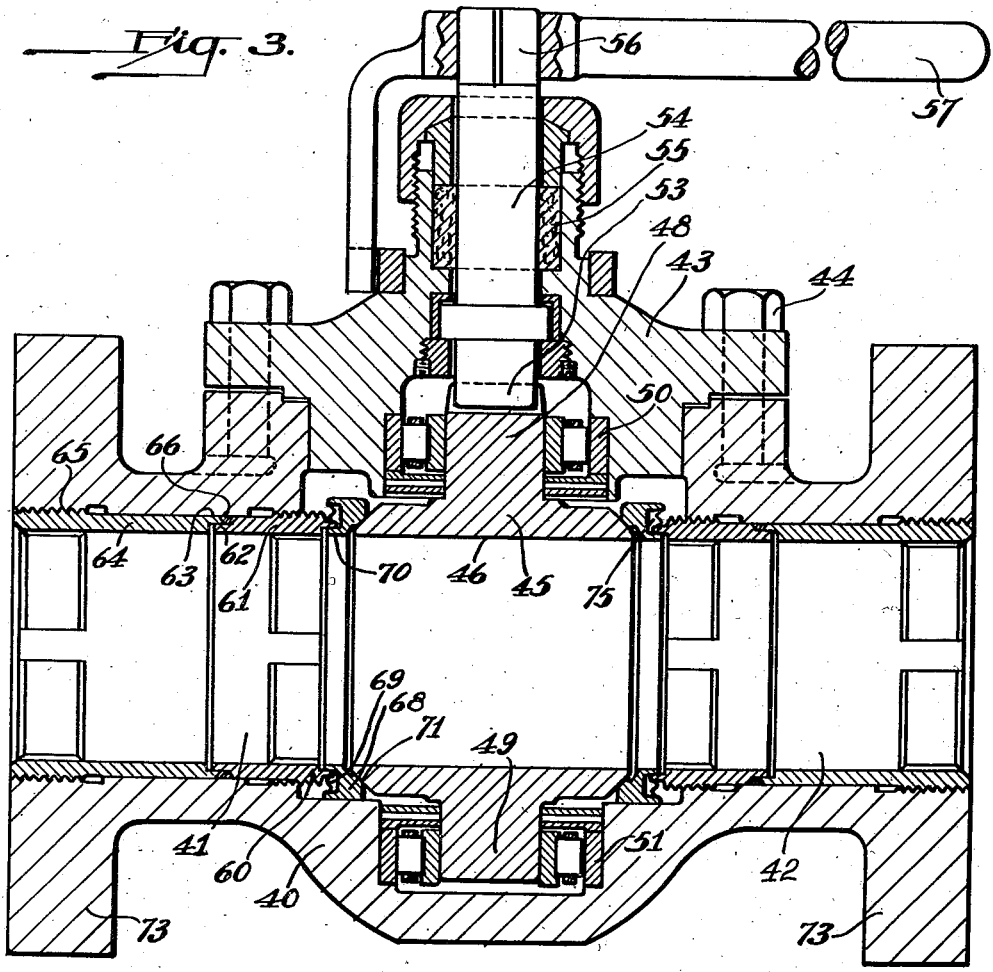
Figure 4:
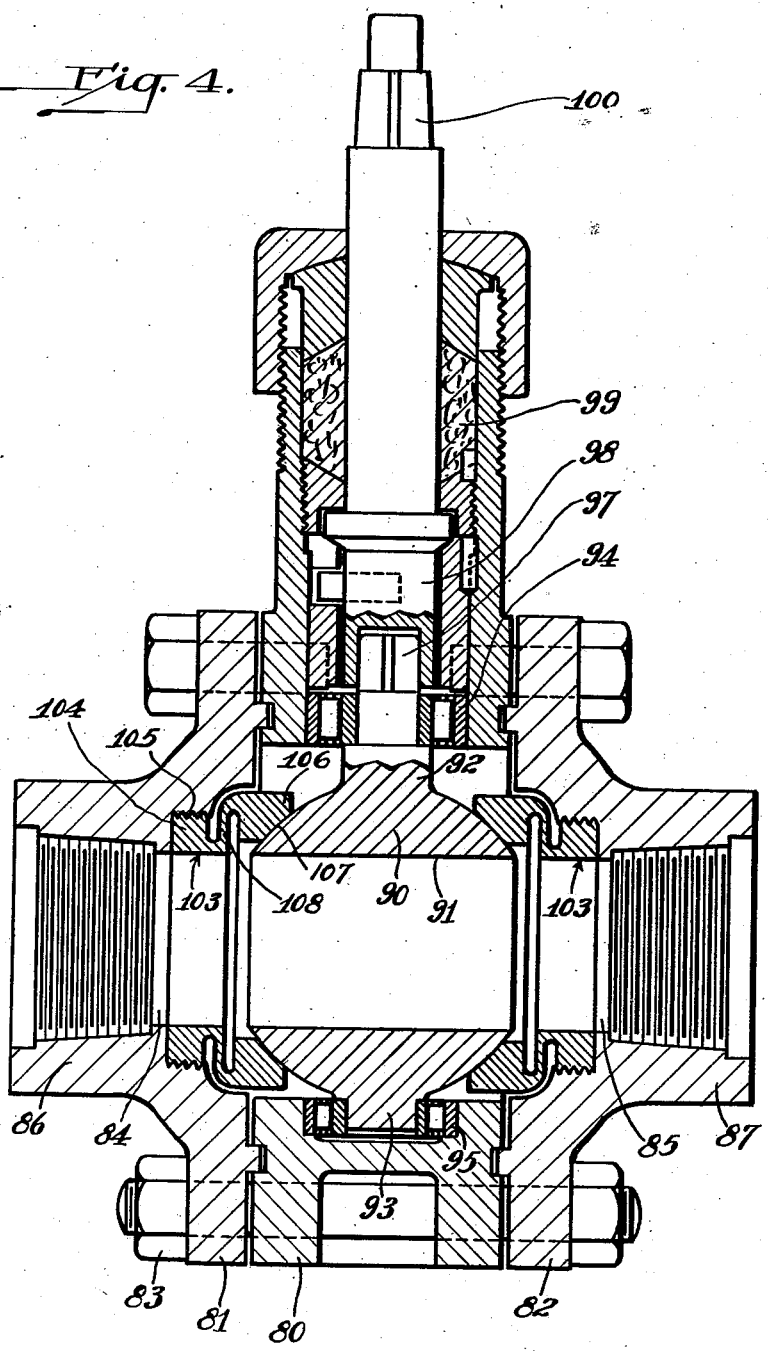
Figure 5:
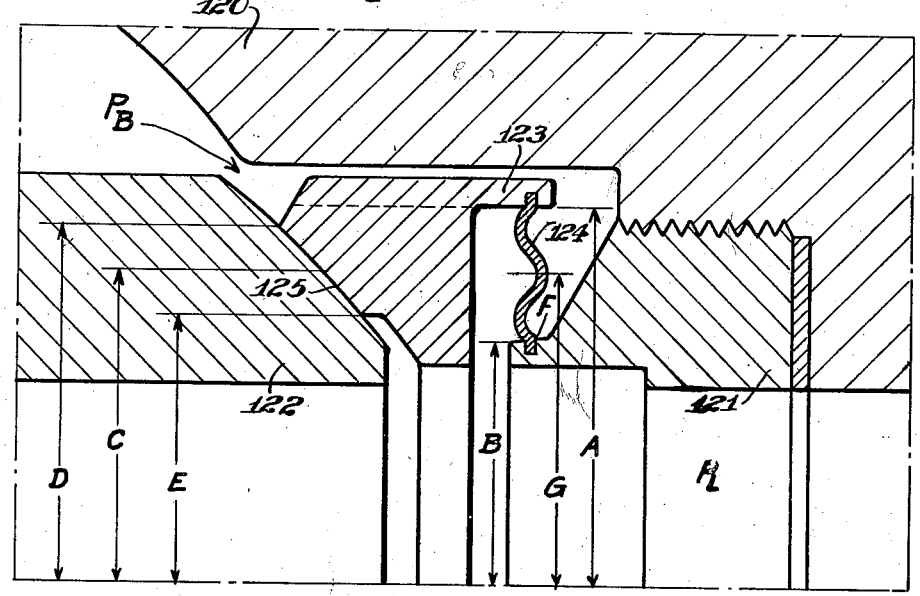
Figure 6:
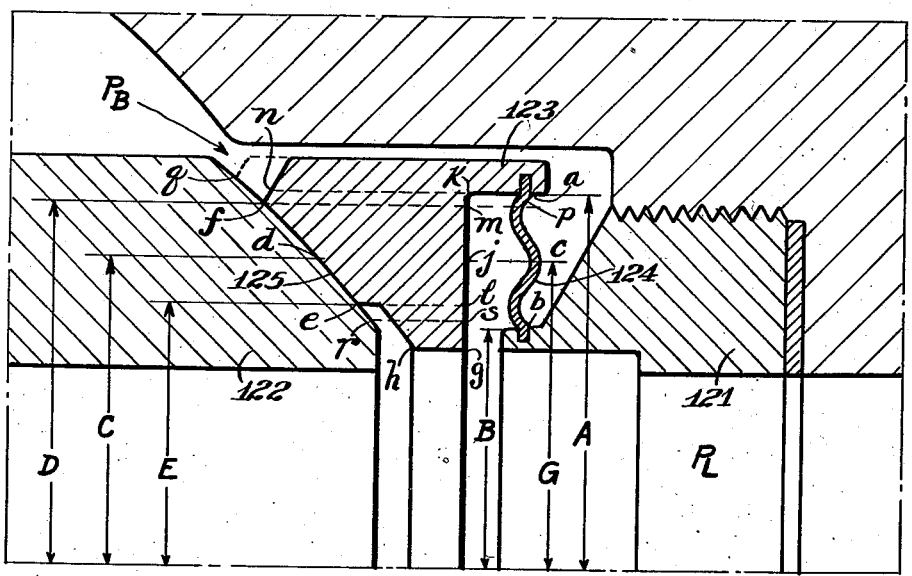

For a better understanding of my invention reference should be made to the accompanying drawings in which Fig. 1 is a vertical longitudinal sectional view through a valve incorporating the principles of my invention; Fig. 2 is an enlarged diametric sectional view of the sealing unit incorporated in the valve shown in Fig. 1; Fig. 3 is a view similar to Fig. 1 but illustrates another embodiment of my invention; Fig. 4 is a view similar to Figs. 1 and 3 and shows still another form of my invention; Fig. 5 is a diagrammatic longitudinal cross-sectional view of the improved sealing means of my invention and illustrates the manner of proportioning the parts thereof; Fig. 6 is a view similar to Fig. 5 and further illustrating diagrammatically the manner of proportioning the parts of my improved sealing means; Fig. 7 is a graphical illustration of the fluid pressure forces on the seat of the sealing ring; and Fig. 8 is a diagrammatic illustration of a sealing means balanced in accordance with the teaching of my invention.

While the principles of my invention are broadly applicable to sealing between any relatively movable members they are particularly useful and applicable in the construction of plug or cock-type valves adapted to handle fluids under high pressures or other difficult pressure conditions, and hence my improved sealing means have been illustrated in the drawings and will be described in conjunction with plug or cock valves. It will be understood that my improved sealing means can be employed in conjunction with plug and cock valves of various types which can be used for substantially any valve control operation. However, the principles of my invention are particularly beneficial in the construction of valves for controlling the flow of fluids under high pressure, or other difficult pressure conditions, for example in oil fields, refineries, pipelines, etc. Accordingly, certain practical embodiments of the principles of my invention are illustrated specifically in the drawings and will now be described, all in accordance with the patent statutes, it being understood that the exact construction of the valve parts, as for example the valve housing and the particular shape of the plug, can be widely varied without departing from the scope of my invention.

Having particular reference to the form of my invention illustrated in Figs. 1 and 2, the numeral 1 indicates generally a valve housing provided with an inlet port 2 which is adapted to be connected to a conduit in any suitable manner, as, for example, by flanges, threads or the like, but which has been conveniently illustrated as including a threaded female end portion 3. The housing 1, as heretofore indicated, may take a plurality of forms to facilitate assembly of the valve parts, but has been illustrated as including a removable side plate 4 which is formed with an outlet port 5 which is also conveniently formed with a threaded female end 6 for connection to a conduit or is open to the atmosphere. The valve housing is adapted, as illustrated, to receive a plug 7 which is preferably of substantially a ball or spherical shape as shown. The plug 7 is formed with a transverse run or passageway 8 which operates to connect the inlet and outlet ports of the valve housing when the plug is properly positioned, as will be understood. The run or passageway 8 of the plug 7 is preferably made cylindrical in shape and of the same diameter as the ports 2 and 5 and the inside diameter of the conduits connected to the female ends 3 and 6.

The plug 7 may be positioned by any suitable means and to this end is preferably formed with trunnions 9 and 10, respectively, at its top and bottom. The trunnion 9 is adapted to be connected to an operating stem and this may be accomplished by forming the trunnion 9 with a slotted end 11 which receives a blade 12 formed on the end of an operating stem 13, which stem is journaled in a stuffing box 14 carried by a removable cap 15 which is received in an appropriate opening 16 in the top of the valve housing and which may be held in place by cap screws 17. The stem 13 which extends through the stuffing box 14 is formed with a squared end 18 which is adapted to removably receive a wrench 19 whereby the stem 13 and thus the plug 7 can be turned through 90° to open and close the valve.

The cap 15 is formed with a circular flange portion 21 which rotatably receives the trunnion 9 and acts as a journal therefor. I particularly contemplate the provision of anti-friction bearings, as for example bearings, between the trunnion 9 and the circular flange 21, as has been illustrated in certain other of the embodiments of my invention, but I also contemplate, as illustrated in Fig. 1 and as just described, the direct journaling of the trunnion 9 in the circular flange 21. The trunnion 10 is rotatably received in and journaled by a circular flange 22 formed integral with a journal plug 23 which is threaded into a suitably tapped opening, as shown, or secured by cap screws or other means in the bottom of the housing 1. The trunnion 10, like the trunnion 9, may be provided with anti-friction bearings, as for example roller bearings, as are employed in certain other of the embodiments of my invention illustrated and described herein, but it should be also understood that a plain bearing, such as illustrated in Fig. 1, can be used.

An important feature of my invention is the provision of novel sealing means between the plug 7 and housing 1. These sealing means have been indicated as a whole by the numeral 25 and have been separately illustrated in Fig. 2 on a somewhat enlarged scale. The sealing means are preferably positioned between the housing 1 and the plug 7 at both the inlet port 2 and the outlet port 5, but it should be particularly understood that I may employ the sealing means only adjacent one of the ports, usually the inlet port. Each sealing means 25 includes a housing ring 26 which is releasably and adjustably received in the housing 1, as by the provision of a threaded connection between the housing and the housing ring. Adjustment of the position of the housing ring 26 in the housing with relation to the plug 7 may be provided for, for example, by the use of one or more shim washers 27 which are positioned between the end of the housing ring and the radially extending flange or shoulder on the housing 1 against which the housing ring 26 abuts.

Forming a part of the sealing means 25 and associated with the housing ring 26 is a packing, sealing or seat ring 28 which is provided with a seat 29 conforming in shape to that of the plug 7 and adapted to engage therewith in sealed relation. The seat ring 28 and the housing ring 26 are adapted to be resiliently connected together in leakproof relation and in the embodiment of my invention illustrated, particularly in Figs. 1 and 2, this is achieved by the provision of a diaphragm ring 30 of resilient metal.

The diaphragm ring 30 can be secured to the seat and housing rings in a plurality of ways, as for example by welding or brazing, but I preferably accomplish this in what I believe to be a particularly practical way. The housing ring 26 is formed with an axially extending circular flange 31 which is shouldered at one end to receive the inner periphery of the diaphragm ring 30, and the end of the flange 31 is then rolled, crimped, welded or bent down over the diaphragm ring 30 in leakproof relation therewith, as indicated at 32. In like fashion the seat ring 28 is provided with a circular axially extending flange 33 which is shouldered to surround and receive the outer periphery of the diaphragm ring 30 with the extremity of the flange 33 being bent, crimped, welded or rolled down over the diaphragm ring 30 in leakproof relation therewith, as indicated at 34.

As illustrated in Figs. 1 and 2, I have found it advisable to form the diaphragm ring 30 with circumferentially extending corrugations or undulations 37 to thereby increase its flexibility so as to provide for greater movement between the seat ring 28 and the housing ring 26 without destroying the fluid-tight connection between these rings, and to insure a square or uniform sealing action between the face of the seat ring 28 and the plug 7. It should be understood that in certain installations where the movement between the seat ring and the housing ring is negligible the diaphragm can be made flat or substantially so.

The embodiment of my invention illustrated in Fig. 3 is in all essential respects quite similar to that already described and illustrated in Figs. 1 and 2. Particularly considering the construction of the valve shown in Fig. 3, the numeral 40 indicates a housing formed with an inlet port 41 and an outlet port 42 and containing a plug 45. The housing is provided with a removable cap or cover 43 held in place thereon by cap screws 44, and with the cap removed the plug 45 can be inserted into or removed from the housing, as will be evident. The plug 45 is preferably made of a ball or spherical shape and is provided with a cylindrical run or passageway 46 therethrough which is adapted to connect the inlet port 41 and the outlet port 42 when the plug 45 is properly positioned.

The plug 45 is formed with an upper trunnion 48 and a lower trunnion 49 which are journaled, respectively, in roller bearings 50 and 51 carried by the housing 40. The upper trunnion 48 is formed with a slotted end which receives a blade 53 formed on the end of a stem 54 carried in a stuffing box 55 incorporated with the cap 43. The end of the stem 54 is squared, as at 56, and is adapted to removably receive a wrench 57 whereby the stem and thus the plug 45 can be rotated to open and close the valve.

Positioned between at least one of the ports and the plug 45 are my improved sealing means heretofore described, and in the preferred practice of my invention these sealing means, indicated as a whole by the numeral 60, are positioned between both the inlet port 41 and the outlet port 42 and the plug 45. The sealing means 60 includes a housing ring 61 which is adjustably received in the housing 40 and while this can be accomplished in various ways one convenient manner of achieving the desired result is illustrated in Fig. 3 and includes the provision of screw threads on the outer periphery of the housing ring 61 which are received in a suitably tapped opening in the housing 40. From the construction shown in Fig. 3, it will be recognized that the housing ring 61 can be positioned in the housing 40 in any of a plurality of axially different positions with respect to the plug 45, and in order to clamp the housing ring 61 in its adjusted position I preferably form the housing ring 61 with an axially extending circular flange 62 which is adapted to have a sliding fit with a complementary circular flange 63 formed on the end of a locking ring 64 which is adjustably carried in the housing 40, as for example, by the provision of a threaded connection 65. Gasket means 66 positioned between the flanges 62 and 63 are usually provided to seal between the housing ring 61 and the locking ring 64.

Associated with each housing ring 61 is a sealing or seat ring 68 which is secured to the housing ring by means of a diaphragm ring 69. Inasmuch as the diaphragm ring 69 and its construction and connection to the seat and housing rings has already been described in detail in conjunction with the form of my invention shown in Figs. 1 and 2, I will not repeat this description here. It will be noted in conjunction with the seat ring 68 that it may be formed with an axially extending flange 70 which may be made integral with the seat ring 68 and which is slidably received in a counterbore in the end of the housing ring 61. The space 75 between the seat ring 68, the diaphragm 69 and the flange 70 may be filled with relatively heavy grease, if desired. The seat ring 68 is, of course, formed with a surface 71 which engages with and coincides with the contour of the plug 45 so that sealing between the plug and the seat ring is achieved.

The housing 40 and particularly the inlet port 41 and the outlet port 42 are adapted to be connected to conduits carrying the fluid to be controlled, and as heretofore indicated the connection of the conduits to the housing can be achieved in any of a plurality of ways. As one typical means for connecting the housing 40 to the fluid-conveying conduits, I have illustrated the housing as being formed with flanges 73 adjacent the inlet and outlet ports, which flanges are secured in any known manner, as by welding, bolts or the like, to similar flanges provided on the ends of the fluid-carrying conduits.

In the embodiment of my invention shown in Fig. 4, the general arrangement of parts is similar to that heretofore described and illustrated in Figs. 1 and 3, but particularly includes a housing 80 having side plates 81 and 82 removably secured thereto as by bolts 83. The side plate 81 includes an inlet port 84 and the side plate 82 includes an outlet port 85. Each of the side plates 81 and 82 are formed with any suitable means whereby a conduit adapted to carry the fluid controlled by the valve can be connected thereto. Such connecting means have been conveniently illustrated in Fig. 4 as including threaded female ends 86 and 87.

Positioned within the housing 80 is a plug 90 which is formed with a cylindrical passage 91 therethrough adapted to connect the inlet port 84 with the outlet port 85 when the plug is properly positioned. The plug 90 is formed with an upper trunnion 92 and a lower trunnion 93 which are received in suitable anti-friction bearings indicated, respectively, at 94 and 95. The upper trunnion 92 is formed with a polygonal end 97 which is received in a complementary socket formed at the lower end of a stem 98 which extends through a stuffing box 99 carried by the housing and which is provided with a polygonal end 100 whereby a wrench for turning the stem and thus the plug 90 can be removably secured to the upper end of the stem.

Positioned between the plug 90 and at least one of the ports, and preferably both the inlet port 84 and the outlet port 85, as shown, are sealing means indicated as a whole by the numeral 103. Each sealing means illustrated includes a housing ring 104 which is adjustably carried by the housing, as by the provision of a threaded connection 105 therewith. Associated with each housing ring 104 is a sealing ring 106 which includes a surface 107 complementary to and in sealing relation with the surface of the plug 90. The housing ring 104 and the seat ring 106 are connected by a diaphragm portion 108 which, in the form of the invention illustrated, is made integral with the housing ring and seat ring by forming these rings and the diaphragm ring 108 all from a single piece of material. However, it should be understood that the sealing means 103 of this form of my invention can be made from three separate pieces, as heretofore described in conjunction with the form of my invention shown in Figs. 1 and 3, and that, moreover, the one-piece sealing means of Fig. 4 can be used in conjunction with the valves of Figs. 1 and 3.

In the operation of my improved valve as just described in the several embodiments thereof illustrated, it will be recognized that the essential constructional features are similar and that the operation is the same. Hence, the operation of the valve shown in Fig. 1 will only be described. In the valve shown in Fig. 1, the plug 7 is carried at all times in pivotal relation with the housing 1 but on a fixed axis and this is achieved by the positive bearing support for the trunnions 9 and 10. This fixed axis pivotal support for the plug 7 in the housing 1 is maintained at all times regardless of whether the plug 7 is in the open or closed position and regardless of the pressure or side thrust on the plug as created by the fluid being controlled by the valve. With the plug 7 being held accurately and on fixed bearings, as just described, in the housing 1, I am able to position the sealing means 25 between the inlet port 2, the outlet port 5 and the plug 7 in such manner that these sealing means are not moved toward or from sealing relation by the pressure of the fluid.

More particularly, the housing ring 26 and the seat ring 28 of each sealing means 25 is connected by the flexible diaphragm 30 in such a way that the seat ring may have relative movement of up to three-sixteenths of an inch or more, if desired, in an axial direction. I have found that in most severe cases a movement in either direction of .010 of an inch is not exceeded and that the diaphragm need not flex beyond this distance. In all events, I position the housing ring 26 in the housing 1 by means of suitable shims 27 so that the seat ring 28 is forced into sealing relation with the axially fixed plug 7 by the mechanical spring pressure exerted by the diaphragm ring 30. As one typical example, I position the housing ring 26 so that when the seat ring 28 is adjusted into engagement with the plug 7 the diaphragm ring 30 will be depressed by the seat ring 28 to approximately .010 inch, at which time a mechanical sealing force, due to the depressing of the diaphragm ring, is exerted on the seat ring 28 to hold it against the plug 7. It should be understood that this pressure can be widely varied and that it depends on the spring temper, length and thickness of the diaphragm and the amount the diaphragm is flexed. Increasing the thickness of the shims 27 not only increases the flexing of the diaphragm ring 30 but likewise increases the mechanical load holding the seat ring 28 against the plug 7, whereas decreasing the thickness of the shims 27 decreases the flexing of the diaphragm ring 30 and the mechanical load between the seat ring 28 and the plug 7. It might be well to point out here that the mechanical sealing pressure between the seat ring and the plug could be increased by the use of springs positioned between the seat ring and the housing ring or that such means can be used alone without any stressing of the diaphragm ring to provide the mechanical sealing pressure I have found that a mechanical sealing load, such as indicated between the seat ring 28 and the plug 7, effects a desired seal between these members and does not provide such a frictional drag between the members as would prevent the easy rotation of the plug 7 by one man with a wrench 19 having a handle as short as one foot. Once the mechanical sealing load of a predetermined, original or initial amount is established it is maintained during substantially the life of the valve and regardless of pressures handled by the valve since the plug is journaled on a fixed axis, and thus the sealing means are not required to take the pressure load on the plug.

While, as stated above, I have found that I can seal fluids under relatively high pressures against leakage between the seat ring 28 and the plug 7 when the seat ring is held against the plug solely by the mechanical force exerted by the flexed diaphragm ring 30, I have discovered, also, that I am able to maintain the sealing pressure just described by the proportioning and arranging of the surfaces of the seat ring 28 and the diap'ragm ring 30 so that the forces tending to push the seat ring toward the plug are counterbalanced by the forces tending to push the seat ring away from the plug. Moreover, I have found that these conditions can be obtained regardless of the fluid pressure in the line of the valve, marked $P_L$ in Fig. 1, or the fluid pressure in the body of the valve, marked $P_B$ in Fig. 1. In other words, regardless of the pressure of the fluid applied or connected to either or both the outside connections of the valve, the seat ring 28 is forced against the plug 7 with only the mechanical force exerted by the flexed diaphragm ring 30. Thus, the valve operates with the fluid pressure forces balanced out and this is true even though the valve only has one seat ring and diaphragm and the fluid under pressure is connected to either side of the valve.

The exact size, position and extent of the seating surface 29 of the seat ring 28 and its relation to the projected surfaces of the diaphragm ring 30 and effective projected surfaces 35 and 29b of seat ring 28 which are engaged by the fluid pressure are carefully determined to provide the type of sealing action desired. In view of the teachings of the present application, this may be done, for example, by taking a valve constructed as heretofore described, closing the valve and applying line pressure so that the pressure in the line is greater than the pressure in the body. Now, if the surfaces are so proportioned that the pressure is unbalanced towards the plug, this can be corrected by cutting away the face 29 as shown at 29a until the unbalance is removed. Attention is directed to the fact that this cutting away of the face 29 can be continued beyond the balancing point whereby the seat ring will be lifted away from the plug.

Although the above balance is attained, the area of the contact face may not be of the desired amount. To increase the area of the contact face without effecting the balance, equal areas must be added to the contact face at the inner and outer diameters of the contact face. To decrease the area of the contact face equal areas must be removed from the inner and outer diameters of the contact face.

The term "effective" as used above and throughout the specification and claims is intended to refer to that projected area which enters directly into the computation of the size and operation of the sealing means. For example, the areas marked T, M, N, K and R in Fig. 8 are effective areas, whereas in Fig. 6 the effective area of the sealing ring 123 engaged by line pressure is $kg$ minus $lg$. In other words, the area $eh$ balances the area $lg$ and thus the effective area is $kl$. Likewise, the effective area of the seat ring engaged by body pressure is only $nf$ when projected into a vertical plane. Accordingly, it will be recognized that those parts of the seat ring or diaphragm which are obviously balanced out and which are merely constructional aids are not to be considered as part of the effective areas.

A method of analytically determining the approximate required seat dimensions will now be given, which I believe is reasonably accurate and that in accordance with it the sealing means can be constructed to provide substantially the type of sealing operation desired for any given set of circumstances.

Having reference to Fig. 5 of the drawings, the numeral 120 indicates a housing which carries a housing ring 121. The housing also rotatably carries a plug 122 or other member to be sealed relative to the housing. Associated with the housing ring 121 is a seat or sealing ring 123 which is connected to the housing ring by a flexible diaphragm 124. In the diagrammatic figure thus provided the dimension A is equal to the outside radius of the free diaphragm ring 124. The dimension B equals the inside radius of the free diaphragm ring 124. The dimension C equals an assumed radius of the balance circle (hereinafter explained) of the seat face 125 of the seat ring 123. The dimension D equals the outside radius of an assumed seat 125. The dimension E equals the inside radius of the assumed seat 125. The dimension G equals the radius of gyration of the diaphragm ring 124. $P_B$ is the pressure of the fluid in the body between the housing 120, and the plug 122. $P_L$ is the pressure in the line or run of the valve.

Let us consider a section of unit width of the sealing means shown in Fig. 5. Taking the sum of the moments about the point F and considering the dimensions of the seat ring 123 and the diaphragm ring 124, to effect a balance of the sealing means with the line pressure $P_L$, acting only, the following equation $(A-B) \times 1 \times P_L \times (G-B) =$
$\qquad\qquad\qquad (A-E) \times 1 \times P_L \times (A-B)$ or $\qquad G-B = A-E$
$\qquad E = A-G+B$ Likewise to effect a balance of the sealing means with body pressure $P_B$, acting only, taking the moments about the point F, the following equation can be written:

$(A-B) \times 1 \times P_B \times (G-B) =$
$\qquad\qquad\qquad (A-D) \times 1 \times P_B \times (A-B)$ or $\qquad G-B = A-D$
$\qquad D = A-G+B$ Thus it will be seen that without considering any pressure condition on the seating face 125 $(D-E)$ itself, $D=E$ since both are equal to the quantity $A-G+B$. Consequently, the assumed face $D-E$ necessary to balance the sealing means against pressures $P_B$ and $P_L$ becomes a line which is the balance circle whose radius is C. Therefore $$C = A-G+B$$

Since the radius of gyration G for a ring section is $$\sqrt{\frac{A^2-B^2}{2}}$$

Then $$C = A+B-\sqrt{\frac{A^2-B^2}{2}}$$

It will be understood in the foregoing equations for determining the sum of the moments about the point F that in each case the total line pressure operating on the diaphragm ring 124 times its moment arm was placed equal to the total line pressure operating on the opposite surface of the seat ring 123 times its moment arm, and that the same procedure was repeated with the body pressure being considered instead of the line pressure.

For practical purposes it is necessary to have a seating surface $fe$, Fig. 6, instead of a line contact as determined by the balance circle. This is developed as follows. According to the general law of hydraulics having to do with fluid flow and applying also the flow between the surfaces of valve seats, the pressure between points $e$ and $f$ on the seat 125, as diagrammatically shown in Fig. 6, will vary depending upon the imperfection of the seating surfaces. Still according to the laws of hydraulics, it is evident that for average conditions the pressure effective on the seat face 125 is equal to the arithmetical mean of the pressure in the line and in the body, namely $$\frac{P_L+P_B}{2}$$

I have graphically illustrated this pressure across the face or seat 125 of the sealing ring, in Fig. 7, in which the ordinant is marked "pressure" and the abscissa is marked "width of seat face".

Now having reference to Fig. 6 of the drawings, it will be recognized that with the pressure $P_L$ on the line side only of the seat ring 123, the load on the diaphragm ring 124 from $c$ to $b$ is carried by the housing ring 121 and does not affect the seat ring 123. The load from $c$ to $a$ is carried by the seat ring 123 but is balanced by an equal load on the seat ring from $j$ to $k$. The load on the seat ring from $l$ to $g$ is balanced by an equal load on the projected area $e$ to $h$. This leaves a load from $j$ to $l$ which must be balanced by the forces acting on the seat 125 or area $e$ to $f$.

Now if a seat of unit width is selected, whose area $de$ is within the balance circle having radius C, then with the pressure on the line side only and considering this pressure to act on the surface $de$ in accordance with Fig. 7, the following equation will apply:

$$jl \times 1 \times P_L = de \times 1 \times \tfrac{1}{2}(P_L + P_B)$$

(In all cases the areas referred to are projected areas in a vertical plane).

Now from the preceding equation:

$$\frac{de}{jl} = \frac{P_L}{1/2(P_L + P_B)}$$

which equals $$\frac{2P_L}{P_L + P_B}$$

Since $P_B = 0$, then $$\frac{de}{jl} = 2 \text{ or } de = 2jl$$

This means that the area $de$ should be twice the area $jl$ and that to balance the line pressure on area $jl$ twice the area $de$ is needed on the valve seat. The width of the seat cannot be increased beyond $e$ without increasing the unbalanced area $jl$. Therefore, the area $df$ is added on the seat ring 123 on the outside of the balance circle having a radius C, the area $df$ being equal to the area $de$.

The same reasoning applies with the pressure on the body side of the seat ring 123. The forces above the line $na$ of Fig. 6 are balanced since the projected areas of the surfaces are equal. The load on area $bc$ is carried by the housing ring 121. The load on the area $ap$ is balanced by the load on the area $nf$. The load on the area $pc$ is balanced by the load on the area $fe$, as $fe$ has twice the area of $pc$ but is only subject to one-half the body pressure $P_B$.

With a pressure $P_B$ on the body side of the seat ring 123 and the pressure $P_L$ on the line side of the seat ring 123 acting concurrently, it is self-evident that all areas are balanced except $pc$, $jl$ and $fe$, the balance of which will now be considered. The equation for balance of these areas is:

$$(\text{area } pc) \times 1 \times P_B + (\text{area } jl) \times 1 \times P_L = (\text{area } fe) \times 1 \times \frac{P_B + P_L}{2}$$

but $$(\text{area } pc) = (\text{area } jl) = \tfrac{1}{2}(\text{area } fe)$$

and substituting in the preceding equation:

$$(\text{area } pc) \times P_B + (\text{area } pc) \times P_L = (2 \text{ area } pc) \times \frac{P_B + P_L}{2}$$

or $$(\text{area } pc) \times (P_B + P_L) = (\text{area } pc) \times (P_B + P_L)$$

This proves that the pressures on these three areas balance.

To unbalance the forces acting on the seat ring 123 in order to create a pressure toward the plug 122 an increment $rs$ can be added, as seen in Fig. 6, to the face 125 of the seat ring 123. The additional load on the seat ring 123 toward the plug 122 due to the increment $rs$ is:

$$ls \times 1 \times P_L - er \times 1 \times \frac{P_L + P_B}{2}$$

but $ls = er$. Therefore the unbalanced load on the seat ring 123 equals $$er \times 1 \times \left( P_L - \frac{P_L + P_B}{2} \right)$$

However, if the increment $rs$ is added and the line pressure $P_L$ drops down and the body pressure $P_B$ builds up to a point much greater than the line pressure, then the body pressure may force the seat ring 123 off the plug.

Specifically, assuming $er$ is only one-fourth a square inch of surface, but $P_B$ is 5000 pounds then the force created is 625 pounds which can be readily calculated, which is more than enough to overcome the spring pressure of the diaphragm. Thus it is evident that in valve structures incorporating the invention fluid pressures on both sides of the closure member must be considered in the construction of the valve having a surface which causes overbalancing with one pressure predominating and likewise causes underbalance when the other pressure is predominating.

In the several embodiments of my invention particularly illustrated in Figs. 1 to 4 of the drawings, it will be understood that each of the sealing means has been constructed substantially in accordance with the general statements made above and derived from actual experience or from the theoretical explanation just given, which several methods of determining the size of the parts of the sealing means are believed to check in all substantial respects. The balancing of the seat ring, so far as fluid pressure is concerned, therefore causes the seat ring to be held against the plug solely by the mechanical force of the stressed diaphragm, which, as heretofore explained, can be adjusted as desired by moving the housing ring toward or away from the plug. The exact position of the seat ring is determined, of course, by the exact adjusted position of its associated housing ring in the housing so that the seat ring engages with the plug with a predetermined mechanically applied sealing force. This force will hold the seat ring against the plug at all times and will compensate for slight movement of the plug with relation to the seat.

The diaphragm connecting the sealing ring to the housing serves to compensate for the expansion of the valve parts due to temperature and pressure conditions. The diaphragm also compensates for discrepancies due to bearing and housing fits, and the warping or distortion of the valve body, for example under a high fluid pressure load, all the while maintaining the proper seal.

Fig. 8 of the drawings illustrates diagrammatically the manner of applying the principle of my invention to a sealing means, and also serves to show by the use of scale lines the balancing of the sealing means. Referring particularly to Fig. 8, the numeral 150 indicates a sealing member which has sliding engagement over a face, shown at T, with one body to be sealed marked 152, and for example comprising the plug of a valve. The sealing member 150 is connected by a bridging member 154 with a closure 156 which engages in sealing relation at its other end with the second member to be sealed, such as a housing 158, which is largely broken away. The closure member 156 is preferably made in the form of a diaphragm which is resilient and which can create a spring tension on the sealing member 150, all as heretofore described in conjunction with the forms of my invention discussed above. Accordingly, the sealing means as a whole, which effect a seal between the body 152 and the housing or like member 158, comprises the sealing member 150, the bridging member 154, and the closure member 156. Actually, the bridging member 154 forms a part of the closure member 156 as will be understood. Now, by proportioning and arranging the parts of the sealing means in accordance with the teaching of my invention, I am able to exactly counterbalance the effect of fluid pressure on either or both sides of the sealing means. Such fluid pressure may be termed the upstream and downstream pressure or can be called the body and line pressure, although it should be understood that a broader term could be used. For convenience I have marked in Fig. 8 a pressure $P_B$ at one side of the sealing means and a pressure $P_L$ at the other side of the sealing means. These pressures, as will be understood, act in separate chambers, at least one of which may, in certain valve or other constructions, be open to the atmosphere.

Extending horizontally of the drawing are a plurality of parallel lines marked 160 which comprise scale lines. It will be seen from Fig. 8 that the lines 160 indicate that the contact face T of the sealing member 150 comprises three equal projected areas. Similarly, the scale lines 160 indicate that the face of the sealing member 150 which is subjected to line pressure of $P_L$ is a face marked M which is equal to two equal areas. The sealing member 150 likewise has a face marked N which when projected into a vertical plane is equal to one area. The face N is subjected to the body pressure $P_B$. The closure member or diaphragm 156 includes a face marked K which is subjected to the line pressure $P_L$ over one equal area. The other side of the closure member or diaphragm 156 provides a face R which is of one area and which is subjected to the body pressure $P_B$.

Now assuming that the sealing means diagrammatically illustrated in Fig. 8 is subjected to a line pressure equal to $P_L$ and a body pressure equal to $P_B$ then the forces tending to move the sealing member 150 into sealing relation with the body 152 comprise the area M or two scale units times $P_L$, plus the area R or one scale unit times $P_B$ times X, plus the area N or one scale unit times $P_B$. In the foregoing expression the term "X" is the proportion of the fluid pressure force acting on the diaphragm which is communicated to the sealing member 150. As heretofore developed in the discussion of the other forms of my invention, it will be recalled that the pressure acting on a diaphragm of the type shown in Fig. 8 acts in such a way that one half of the force is carried on the fixed housing support of the diaphragm and the other half of the pressure acts on the sealing member 150; in other words, X equals one half. Now totaling the forces tending to move the sealing member 150 into sealing relation with the body 152, it will be seen that the total is $2P_L + \frac{1}{2}P_B + 1P_B$. This equals $+(\frac{3}{2}P_B + 2P_L)$.

Now considering the forces created by $P_B$ and $P_L$ and tending to move the sealing member 150 away from the body 152, it will be seen that $P_L$ acting on the closure member 156 equals K times $P_L$ times X or $-\frac{1}{2}P_L$. $P_L$ acting on the surface T in accordance with the hydraulic principles discussed heretofore equals $$T \cdot \frac{P_L}{2} \text{ or } -3/2 P_L$$

The forces created by the body pressure $P_B$ and tending to move the sealing member 150 away from the body 152 equal $$T \cdot \frac{P_B}{2} \text{ or } -3/2 P_B$$

This equals $-(\frac{3}{2}P_B + 2P_L)$.

It will be noted that this value is equal in amount but opposite in sense to the quantity at the end of the preceding paragraph and that the forces represented thereby counterbalance each other. Thus it will be seen that we can state in equation form the forces acting on a sealing means and created by line and body pressures. Particularly this equation is $$S(K \cdot P_L \cdot X) + S\left(\frac{P_B + P_L}{2} \cdot T\right) + S(M \cdot P_L) + S(N \cdot P_B) + S(R \cdot P_B \cdot X) = 0$$

in which K is the projected area of the diaphragm member subjected to line pressure; $P_L$ is the line pressure; X is the proportion of the force acting on the diaphragm which is communicated to the sealing member; S is the sense in which the force tends to move the sealing member and is plus 1 when moving the sealing member in one direction and is minus 1 when moving the sealing member in the other; T is the projected area of the actual sealing or contact face of the sealing member; M is the projected area of the sealing member subjected to line pressure; N is the projected area of the sealing member subjected to body pressure; $P_B$ is the body pressure; and R is the projected area of the diaphragm member subjected to body pressure.

Stated more broadly the equation can be written:

$$S(K \cdot P_L \cdot X') + S(Z \cdot T) + S(M \cdot P_L) + S(N \cdot P_B) + S(R \cdot P_B \cdot X'') = 0$$

in which X' is the proportion of the force acting on the line side of the diaphragm or closure member which is communicated to the sealing member; X'' is the proportion of the force acting on the body side of the diaphragm or closure member which is communicated to the sealing member; Z is the average fluid pressure operating on the face T; and the remaining terms are as already given above. X' and X'' are substituted in the more broadly stated equation for the reason that the mechanical effect of the diaphragm or the effective proportion of the force acting thereon may be different for the different sides of the diaphragm in structures other than those shown. Z has been used to replace the term $$\frac{P_B + P_L}{2}$$

as written in the first equation for the reason that while the more specific term given is believed to be correct for ordinary machined surfaces operating under the pressures and with the fluids indicated, nevertheless the term Z is employed in the broader equation to cover any pressure conditions on the face T due to variations in the construction of the sealing means of my invention such as changes in the metals of the surfaces, the machining finish, the fluid sealed, the shape or grooving of the sealing surface or surfaces, etc.

From the foregoing it will be recognized that I have considered all of the fluid pressure forces acting upon means for sealing between two spaced-apart or relatively movable bodies and that I have proportioned, arranged and positioned the parts of a sealing means regardless of its exact form so that the effects of the forces of both line and body pressures thereon can be balanced or substantially so. The construction of a sealing means of any specific form so as to balance is simplified by the use of the balancing equation which I have developed, which equation acts as further teaching of the actual trial and theoretical methods of construction already discussed in conjunction with the forms of my invention shown in Figs. 1 to 7.

All of the foregoing remarks, explanations and description relating to the forms of my invention shown in Figs. 1 to 7 apply also wherever pertinent to the sealing means shown in Fig. 8 of the drawings and incorporating the principles of my invention, as will be understood.

From the foregoing it will be recognized that the objects of my invention have been achieved by the provision of an improved valve of the plug or cock type which is particularly adapted for use in handling fluids under high pressures or other difficult pressure conditions. I have also provided an improved sealing means adapted to pack off or seal between a housing and a movable member or between relatively movable members. The exact type of sealing action desired between the relatively movable members, and particularly between a valve plug and housing can be obtained whereby the effects of the fluid pressures on the sealing means are completely balanced or are unbalanced to any desired degree. In my improved valve the plug can easily be rotated to open or shut the valve with a relatively small wrench, and the sealing surfaces in the valve are not subjected to pressures which freeze the valve seats or subject the sealing parts to excessive loads, galling, tearing, or the like. The very heavy pressure thrust encountered by the valve in sealing off fluid under high pressure is carried directly on heavy bearings which may be of the antifriction type so that wear of the valve parts or damage to the flexible sealing means incorporated in the valve is prevented. It will be recognized, moreover, that when the sealing means is balanced it performs in the desired capacity regardless of whether the line pressure or the body pressure or both are acting thereon. Thus, if for any reason one of the sealing means fails, the other acts in a sealing capacity regardless of which direction the pressure is applied thereto or whether the pressure applied thereon is both line and body pressure.

While in accordance with the patent statutes I have particularly illustrated and described certain embodiments of my invention, it will be understood that my invention is not limited thereto but is defined in the appended claims.

I claim:

1. A leakproof flexible joint comprising an annular base, a packing ring adapted to bear against the part to be packed off, a flexible ring fixedly attached to both the packing ring and the base, said base having a counterbore therein, and a flange depending from the packing ring, said flange fitting in said counterbore.

2. A leakproof flexible joint comprising an annular base, an annular boss projecting from the base, said base having a counterbore therein, a packing ring, a flange depending from the ring and extending into the counterbore, a flexible ring extending between the base and the packing ring, said boss being rolled over onto the inner edge of the flexible ring, and said packing ring being rolled over upon the outer edge of the flexible ring whereby a leakproof joint is provided.

3. In combination a housing member, a second member associated with the housing member, means mounting the members for relative movement with respect to each other, an endless ring-shaped diaphragm secured to one of said members in fluid-tight relation therewith, a sealing ring secured to the diaphragm in fluid-tight relation therewith and engaging slidably and in sealing relation with the other of said members so as to provide separate chambers, said sealing ring and diaphragm being provided with faces so constructed and arranged that when subjected to fluid under pressure and tending to pass from one chamber to the other the sum of the forces created by the fluid and acting to move the sealing ring into sealing relation is substantially counterbalanced by the sum of the forces created by the fluid and tending to pass from one chamber to the other and acting to move the sealing ring away from sealing relation.

4. Sealing means adapted to be subjected to line pressure on one side of the sealing means and body pressure on the other side of the sealing means and including a sealing member adapted to engage in sealing relation with a body, a closure diaphragm secured to the sealing member in fluid-tight relation, means secured to the closure diaphragm in fluid-tight relation and adapted to secure the diaphragm in fluid-tight relation with a second body, said sealing member and diaphragm being provided with areas so proportioned, positioned and arranged that when subjected to fluid pressure the algebraic sum of the forces created by the fluid pressure acting to move the sealing member into and away from sealing relation with said first-named body is substantially zero in accordance with the following:

$$S(KP_L \cdot X) + S\left(\frac{P_B + P_L}{2} \cdot T\right) + S(M \cdot P_L) + S(N \cdot P_B) + S(R \cdot P_B \cdot X) = 0$$

in which $K$ is the projected effective area of the diaphragm subjected to line pressure; $P_L$ is the line pressure; $X$ is the proportion of the force acting on the diaphragm which is communicated to the sealing member; $S$ is the sense in which the force tends to move the sealing member and is plus 1 when acting towards the first-named body to be sealed and is minus 1 when acting away from the body to be sealed; $T$ is the projected effective area of the sealing or contact face of the sealing member; $M$ is the projected effective area of the sealing member subjected to line pressure; $N$ is the projected effective area of the sealing member subjected to body pressure; $P_B$ is the body pressure; and $R$ is the projected effective area of the diaphragm member subjected to body pressure.

5. A valve particularly adapted for the control of fluids under high pressure and comprising a housing, a gate movable relative to the housing to open or shut the valve, means for sealing between the gate and the housing and forming two chambers subjected, respectively, to line fluid pressure and body fluid pressure, said sealing means including a ring-shaped sealing member adapted to engage slidably but in sealing relation with the gate, a substantially flat, ring-shaped closure diaphragm secured to the sealing member in fluid-tight relation, means for securing the closure diaphragm to the housing in fluid-tight relation therewith, said sealing member and diaphragm being provided with areas so proportioned, positioned and arranged that when subjected to fluid pressure the algebraic sum of the forces created by the fluid pressure and acting to move the sealing member into or away from sealing relation with the gate is substantially zero in accordance with the following:

$$S(K \cdot P_L \cdot X) + S\left(\frac{P_B + P_L}{2} \cdot T\right) + S(M \cdot P_L) + S(N \cdot P_B) + S(R \cdot P_B \cdot X) = 0$$

in which K is the projected effective area of the diaphragm subjected to line pressure; $P_L$ is the line pressure; X is the diaphragm effect; S is the sense in which the fluid pressure force tending to move the sealing member to or from sealing relation, acts and is plus 1 when acting in one direction and is minus 1 when acting in the other direction; T is the projected effective area of the sealing or contact face of the sealing member; M is the projected effective area of the sealing member subjected to line pressure; N is the projected effective area of the sealing member subjected to body pressure; $P_B$ is the body pressure; and R is the projected effective area of the diaphragm member subjected to body pressure, said diaphragm having an inherent resiliency holding the sealing member in sealing relation with the gate.

6. A valve particularly adapted for the control of fluids under pressure and comprising a housing, a substantially spherical gate rotatable relative to the housing to open or shut the valve, means for sealing between the gate and the housing and forming two chambers subjected, respectively, to line fluid pressure and body fluid pressure, said sealing means including a ring-shaped sealing member adapted to engage slidably but in sealing relation with the gate, a washer-shaped closure diaphragm secured at its outer periphery to the sealing member in fluid-tight relation therewith, means securing the inner periphery of the closure diaphragm to the housing in fluid-tight relation therewith, said sealing member and closure diapragm being so proportioned, positioned and arranged that when subjected to fluid pressure the algebraic sum of the forces created by the fluid pressure and acting to move the sealing member into or away from sealing relation with the gate is substantially zero in accordance with the following:

$$S(K \cdot P_L \cdot X) + S\left(\frac{P_B + P_L}{2} \cdot T\right) + S(M \cdot P_L) + S(N \cdot P_B) + S(R \cdot P_B \cdot X) = 0$$

in which K is the projected effective area of the diaphragm subjected to line pressure; $P_L$ is the line pressure; X is the diaphragm effect; S is the sense in which the fluid pressure force tending to move the sealing member to or from sealing relation, acts and is plus 1 when acting in one direction and is minus 1 when acting in the other direction; T is the projected effective area of the sealing or contact face of the sealing member; M is the projected effective area of the sealing member subjected to line pressure; N is the projected effective area of the sealing member subjected to body pressure; $P_B$ is the body pressure; and R is the projected effective area of the diaphragm member subjected to body pressure.

7. In combination, spaced-apart bodies, means for sealing between the bodies to provide separate chambers subjected respectively to line fluid pressure and body fluid pressure, said means being adapted to be acted on by the said fluid pressures, said means including a sealing member having a sealing surface engaging in sealing relation with one of the bodies, and a closure member secured to the sealing member and to the other body in sealing relation therewith, said sealing member and closure member being provided with areas so constructed and arranged that the algebraic sum of the forces created by the fluid pressures acting to move the sealing member into and away from sealing relation is substantially zero in accordance with the following equation:

$$S(K \cdot P_L \cdot X') + S(T \cdot Z) + S(M \cdot P_L) + S(N \cdot P_B) + S(R \cdot P_B \cdot X'') = 0$$

in which S is the sense in which the fluid pressure force tending to move the sealing member to or from sealing relation acts and is plus 1 when acting in one direction and is minus 1 when acting in the opposite direction; K is the projected effective area of the closure member subjected to line pressure; $P_L$ is the line pressure; X' is the proportion of the force acting on the line side of the closure member which is communicated to the sealing member; T is the projected effective area of the sealing face of the sealing member; Z is the average fluid pressure operating on the face T; M is the projected effective area of the sealing member subjected to line pressure; N is the projected effective area of the sealing member subjected to body pressure; $P_B$ is the body pressure; R is the projected effective area of the closure member subjected to body pressure; and X'' is the proportion of the force acting on the body side of the closure member which is communicated to the sealing member.

8. In combination in a valve, a housing, a gate movably mounted in the housing, means for sealing between the housing and gate to provide separate chambers to receive the fluid under pressure in the body and in the line of the valve, said means comprising an endless sealing member having a contact surface adapted to engage slidably but in sealing relation with the gate, an endless, substantially flat closure member secured to the sealing member and to the housing in sealing relation therewith, said sealing member and closure member having surfaces other than the contact surface on which the fluid under pressure in the separate chambers acts, the last-named surfaces being constructed and arranged so that the algebraic sum of the forces resulting from the body and line fluid pressure thereon and tending to move the sealing member against the gate with which it seals is substantially equal and opposite to the fluid pressure forces acting on the contact surface of the sealing member and tending to move it away from the gate with which it seals, and means for adjusting the position of the closure member relative to the housing to put a desired resilient pressure on the sealing member to hold it against the gate.

9. Apparatus for sealing high fluid pressures from between relatively movable members which comprises a fixed housing ring adapted to be secured to one of the members, a washer diaphragm secured around its inner edge to the housing ring, and a packing ring secured by substantially its outer edge to the outer edge of the diaphragm and adapted to bear slidably and in sealing relation with the other of the relatively movable members due to the resiliency of the diaphragm, said parts being provided with areas so arranged that changes in fluid pressure applied to both sides of the diaphragm and packing ring and on the sealing face of the packing ring cause substantially no change in the sealing pressure exerted by the packing ring.

10. A valve comprising a housing, a gate movable relative to the housing to open and shut the valve, sealing means including a sealing ring adapted to engage slidably but in sealing relation with the gate, one side of the ring being subjected to line fluid pressure and the other side being subjected to body fluid pressure, said sealing ring having surfaces adapted to be engaged by the pressure of the fluid in the line and body of the valve and adapted to force the sealing ring against or away from the gate, means continuously and resiliently pressing the sealing ring against the gate and including surfaces adapted to be engaged by the pressure of the fluid in the line and body of the valve and adapted to substantially counterbalance the effect of the fluid pressure on the sealing ring.

11. A valve comprising a housing, a gate movable relative to the housing to open and shut the valve, sealing means including a sealing ring adapted to engage slidably but in sealing relation with the gate, the ring being subjected to line and body fluid pressure in the valve, means operable by the fluid under pressure in the line and body of the valve to balance out any unbalanced forces on the sealing ring resulting from fluid under pressure in the line and body of the valve and acting on the ring and its sealing face, said last-named means acting also to force the sealing ring resiliently against the gate and including structure sealing the sealing ring relative to the housing, and means for adjusting the position of the said sealing structure relative to the housing.

12. In a valve, a housing, a gate member movable relative to the housing, a sealing ring engaging slidably but in sealing relation with the gate member, a diaphragm secured to the sealing ring and housing in fluid-tight relation, both the ring and diaphragm being subjected to line and body fluid pressure in the valve, said diaphragm and sealing ring having opposed surfaces subjected to line fluid pressure, the projected effective area of the surface of the diaphragm being less than the projected effective area of the surface of the ring, said ring having a contacting face with the member which face has a projected effective area that when added to the projected effective area of the diaphragm equals approximtely twice the projected effective area of the said opposed surface of the sealing ring, said sealing ring having a projected effective surface adapted to be subjected to body fluid pressure and equal to approximately one-half of the difference between the projected effective area of the contacting face and the projected effective area of the diaphragm acted on by the body pressure.

JOSEPH HEINEN.

CERTIFICATE OF CORRECTION.

Patent No. 2,191,232.  February 20, 1940.

JOSEPH HEINEN.

It is hereby certified that error appears in the printed specification of the above numbered patent requiring correction as follows: Page 3, second column, line 46, after the word "example" insert roller; page 9, second column, line 49, claim 4, in the initial portion of the equation, for "$S(KP._L.X)$" read $S(K.P_L.X)$; and that the said Letters Patent should be read with this correction therein that the same may conform to the record of the case in the Patent Office.

Signed and sealed this 16th day of April, A. D. 1940.

(Seal)

Leslie Frazer
Acting Commissioner of Patents.